United States Patent [19]

Hodge

[11] 3,844,042

[45] Oct. 29, 1974

[54] NAVIGATION AID

[76] Inventor: Arthur G. Hodge, 1320 Sherman Ave., Janesville, Wis. 53545

[22] Filed: Sept. 29, 1971

[21] Appl. No.: 184,852

[52] U.S. Cl. .............................. 33/1 SD, 33/75 R
[51] Int. Cl. .............................................. B43l 7/00
[58] Field of Search ....... 33/1 SD, 1 N, 1 C, 76 VA, 33/75 R

[56] References Cited
UNITED STATES PATENTS

| 499,495 | 6/1893 | Baker | 33/75 R |
|---|---|---|---|
| 1,226,141 | 5/1917 | Sterling et al. | 33/75 R |
| 2,138,595 | 11/1938 | Burgin | 33/1 C |
| 2,316,534 | 4/1943 | Parks | 33/75 R |
| 2,424,065 | 7/1947 | Stewart | 33/1 N |
| 2,557,981 | 6/1951 | Larsen | 33/76 VA |
| 2,904,885 | 9/1959 | Wood | 33/75 R X |

Primary Examiner—William D. Martin, Jr.
Attorney, Agent, or Firm—Howard M. Herriot

[57] ABSTRACT

Circular scale device, and method of using it, for helping a pilot of a VOR-equipped aircraft, within range of two VOR broadcast points, determine and record on the device the location of the aircraft relative to any desired third point which is the intersection of VOR radials from the two VOR broadcast points, and determine on the device course directions in which to proceed to the desired third point. The device includes a base plate and two pointer members each pivotably mounted to the center of a circular scale on the base plate, wherein each of the pointer members has pointing means at each end of a line extending thereacross through the center and has directional means visually distinguishing one side of the line from the other.

1 Claim, 5 Drawing Figures

PATENTED OCT 29 1974 3,844,042

Inventor
Arthur G. Hodge
By Howard M. Herriot
Attorney

Inventor
Arthur G. Hodge
By Howard M. Herriot
Attorney

NAVIGATION AID

BACKGROUND OF THE INVENTION

This invention relates to navigation aid devices especially suited for use in connection with Very High Frequency Omnidirectional Radio Range navigation equipment and techniques, commonly referred to as OMNI, or as VOR, and hereinafter referred to as VOR.

The VOR equipment in an aircraft includes a suitable VHF receiver which may be tuned by the pilot to a predetermined VOR broadcast station, with an audio device by means of which the pilot may select the station identification signals. The air-borne VOR equipment further includes a VOR station radial bearing selector (Course Selector) which is calibrated from zero through 360° and which the pilot can manually adjust to select and set any desired VOR radial emanating from the VOR station. Also included in the air-borne equipment is a TO-FROM indicator, which, after a station has been selected and the VOR radial set, will show whether the aircraft is on the TO side of the station or on the FROM side of the station or neutrally over the station area. The air-borne equipment also includes a Course Deviation Indicator (CDI) which shows, by needle deflection, whether the aircraft is located directly on the set VOR radial line or to the left or right of this line.

Aeronautical charts or maps show the location of VOR stations with a fully calibrated circular scale or compass rose around each VOR station with the station at the center of the scale. Such maps also give the radio data for the station. Aeronautical guide books are available which give information on all airports and all VOR stations.

This invention provides a convenient device for helping the pilot of a VOR-equipped aircraft, within range of two VOR broadcast stations, easily and graphically determine the location of the aircraft relative to any desired point, e.g. a destination point such as a small airport, landing field or other place which does not have VOR broadcast equipment. To use this invention, the pilot selects, from an aeronautical map, for each of two VOR stations, the radial line emanating therefrom which passes through the desired destination point. The two lines so selected, intersecting at the destination point, form four sectors or quadrants. The aircraft is in one of these quadrants, and this invention helps the pilot determine that particular quadrant and select a course to fly on toward the destination point.

SUMMARY OF THE INVENTION

The device of this invention includes a base plate and two pointer members each pivotably mounted to the center of a circular scale on the base plate. The center or pivot point represents the destination point, and, when the pointing means of the pointer member is set on the scale, the line extending through said pivot point and said pointing means represents of the selected VOR radial line. The invention permits the pilot to easily and graphically determine and record, on the device, the particular quadrant in which the aircraft is located, and the direction in which the aircraft should be flown to proceed inbound in that particular quadrant to proceed toward the destination point.

DETAILED DESCRIPTION

Figure 1:
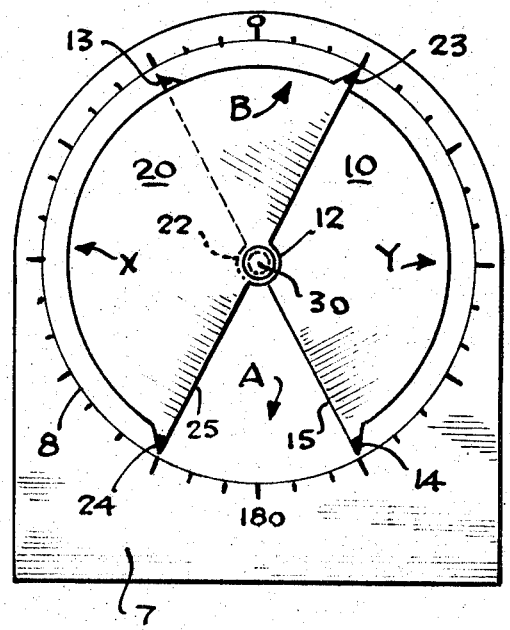
FIG. 1 is a top plan view of a first device, illustrating one embodiment of the invention.
Figure 2:
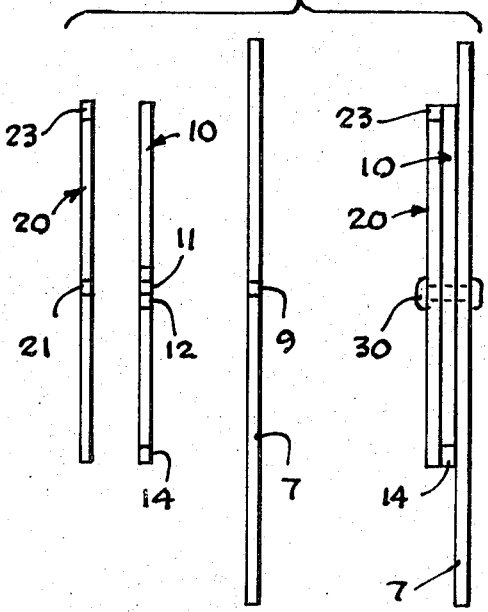
FIG. 2 includes a side view of said device, and of parts thereof.
Figure 3:
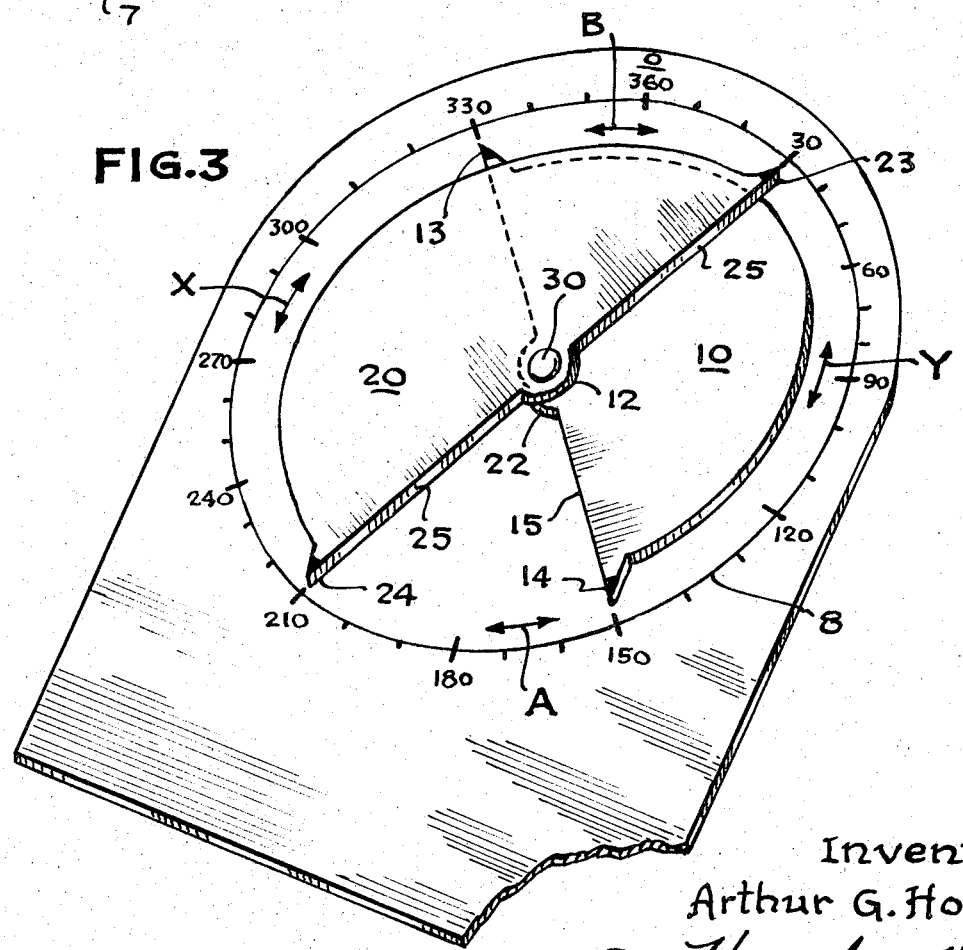
FIG. 3 is a perspective view of said device.

Referring to the drawings and, in particular, to FIGS. 1 – 3 thereof, the device is shown as including a base plate 7 having a circular scale 8 thereon calibrated in degrees, and having a hole 9 through the plate at the center of the circular scale. A first pointer member, half-disc 10, lies immediately above the plate. A second pointer member, second half-disc 20, lies immediately above half-disc 10. Each of members 10 and 20 is pivotably mounted for rotation on a pivot pin or shaft 30 which passes through hole 9 in the plate and through holes 11 and 21 in half-discs 10 and 20 respectively. The half-discs 10 and 20 each have small center extensions 12 and 22 respectively to accommodate holes 11 and 21 and the pivot pin 30. Half-disc 10 has, as pointing means, point extensions 13 and 14 at the outer end of each straight edge portion 15 thereof, and half-disc 20 similarly has, as pointing means, point extensions 23 and 24 at the outer end of each straight edge portion 25, for setting or pointing on the scale 8. The half-discs 10 and 20 may each be dark in color, e.g. black, and the base plate 7 light in color, e.g. white, except for the markings of scale 8. Other means of contrasting the half-discs with the base plate may of course be used. On the scale 8, as is conventional, the 0° or 360° marking represents north, 180° is south, 90° east, etc.

The device shown in FIGS. 1–3 may be used and operated as follows. When the pilot of a VOR-equipped aircraft wishes to proceed to a destination point which is not at or near a VOR broadcast station, he selects from an aeronautical chart or may two VOR broadcast stations within range of the aircraft and notes from the map the radial bearing emanating from each of the two stations and running through said destination point. He then tunes in on the receiver to one of said selected two VOR stations, setting the Course Selector to the radial noted therefor from the map, and he then notes the deflection of the Course Deviation Indicator (CDI) needle of the instrument, whether deflection is to the left (counterclockwise side) or the right (clockwise side) of the set radial. Now he sets one of the half-discs, e.g. the half-disc 10, so that its pointing means points on scale 8 to this first noted radial, with the great mass of the half-disc on the same side (right or left) of the set radial as the noted deflection of the CDI needle. He then tunes in on the receiver to the second of said selected two VOR stations, setting the Course Selector to the radial noted therefor from the map, and he then notes the deflection of the CDI needle, whether deflecting to the left or to the right of the set radial. Now he sets the other half-disc, e.g. half-disc 20, so that its pointing means points on scale 8 to this second set radial, with the great mass of the halfdisc on the same side (right or left) of the set radial as the noted deflection (right or left) of the CDI needle. The pivot shaft 30 represents the destination point and the open quadrant, A, represents the quadrant in which the aircraft is located, hereinafter sometimes called the location quadrant. The pilot can now fly inbound on a heading parallel to the bisect line of the location quadrant, until intercepting one of the legs of that quadrant. He then changes course to proceed inbound on such leg until arriving at the destination point.

To better understand the device shown in FIGS. 1-3, assume that the aircraft's location is unknown and that the destination point is a small town airport without a VOr broadcast station, which airport lies on the 150° radial of a VOR station No. 1 and on the 30° radial of VOR station No. 2. When the pilot tunes in to VOR No. 1 with the Course Selector set to 150°, he notes that the CDI needle deflects to the left. He then sets half-disc 10 with pointing means pointed at 150°, and with the great mass of the half-disc to the left (counterclockwise side) of 150°, as shown in the drawings. When the pilot tunes in to VOR No. 2 with the Course Selector set to 30°, he notes that the CDI needle deflects to the left. He then sets half-disc 20 with pointing means pointed at 30°, and with the great mass of the half-disc to the left (counterclockwise side) of 30°, as shown in the drawings. The resulting open or uncovered quadrant A (the location quadrant), lying between pointer ends 14 and 24, is the quadrant in which the aircraft is located, with the pivot shaft 30 representing the destination point. The pilot thus knows the aircraft is generally south of the destination point. The pilot will also see on the device that he should proceed toward destination on a zero degree course, or north, parallel to the bisect line of quadrant A (midway between pointers 14, 24 and midway between pointers 13, 23. He will know, from TO or FROM indications on the VOR instrument equipment of the aircraft, and from the relationship on the map of VOR No. 1 and VOR No. 2 to the destination point, that he will proceed generally TO the VOR station No. 1 and generally FROM the VOR station No. 2, but first on a north course, until one of the legs is intercepted, whereupon the course is changed to follow that leg inbound to the destination point; this last leg will be in the TO direction if that leg is the 150° radial of VOR station No. 1, or in the FROM direction if that leg is the 30° radial of VOR station No. 2.

In the device shown in FIGS. 1-3, the located quadrant A is easily recognized as the open or empty quadrant free and clear of the great mass of the two half-disc pointer members. If the half-disc pointer member 10 and 20 are black, and the base plate 7 is white, or some other such contrast is provided, the recognition of the located quadrant is made even easier. Quadrant B, the equal quadrant opposite the located quadrant A, is easily recognized as being the quadrant between pointer ends 13 and 23. The remaining quadrants X and Y are also easily recognized by the pointer ends defining the limits thereof.

Figure 4:
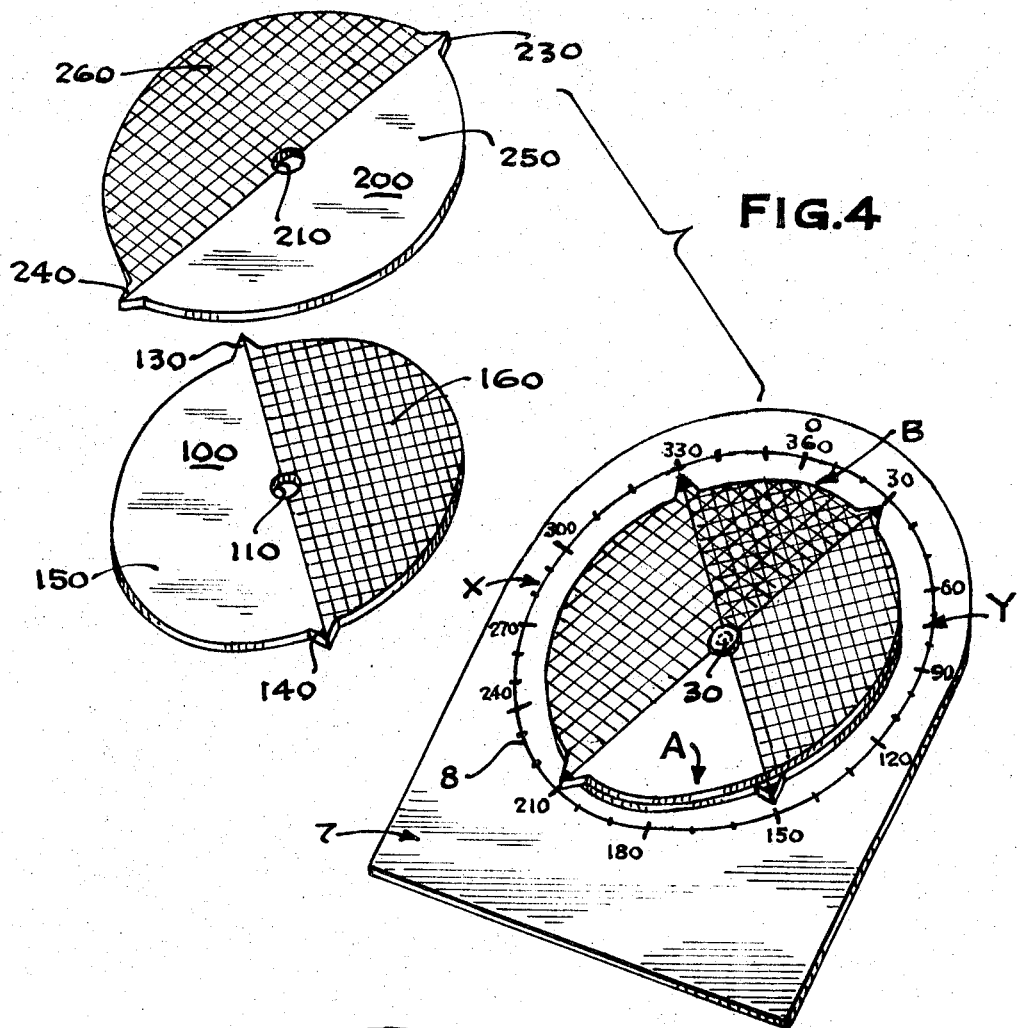
FIG. 4 includes a perspective view of a second device, and of parts thereof, illustrating a second embodiment of the invention.

Referring now to FIG. 4, illustrating a second embodiment of the invention, there is shown a locator device wherein an identical base plate 7 is used. The base plate has rotatably mounted thereon two full discs 100 and 200 mounted pivotably at the center of circular scale 8 through hole 9 by pivot shaft 30. Each of the full discs 100, 200, is clear or transparent over one-half thereof as shown at areas 150 and 250 thereof respectively, and is of some contrasting effect over the other one-half thereof as shown by the cross-hatch marked areas 160 and 260 thereof. The contrasting effect may be provided by a lesser transparency, by translucency, by opacity, or the like, or by markings such as the cross-hatch markings as shown. Diametrically opposite pointer end extensions 130, 140 on disc 100, and corresponding extensions 230, 240 on disc 200, located at the ends of the area dividing diameter line, provide the setting and pointing means. Hole 110 in disc 100, and hole 210 in disc 200, accommodate the pivot shaft 30. The device of FIG. 4 is operated the same as that of FIGS. 1-3, using the contrast halves 160 and 260 as the directional side distinguishing means, comparing with the use of the great mass sides of the half-discs of FIGS. 1-3. In the device shown in FIG. 4, the located quadrant A is the clear or transparent quadrant free and clear of the cross-hatch markings, i.e. free and clear of the contrast markings, color or other contrasting means represented by reference numerals 160 and 260, which overlies each of the other quadrants. The quadrant B is easily recognized by the pointer ends defining it and further by the contrast effect, either increased or maintained the same, of the double layer of contrasting means, as shown. The other quadrants, X and Y, are also easily recognized by the pointer ends that define them. If desired, instead of crosshatch markings on the onehalf of the full discs, translucent colors of most any choice could be used to give a desired contrast, or complete opacity by using black or other solid opaque color may be used.

To better understand the device shown in FIG. 4, assume that the aircraft's location is unknown and the destination point is a small town airport without any nearby VOR broadcast station, which airport lies on the 330° radial of a VOR station No. 3 and on the 30° radial of a VOR station No. 2. When the pilot tunes in to VOR No. 3 with the Course Selector set to 330°, he notes that the CDI needle deflects to the right. He then sets full disc 100 with pointing means pointed at 330°, and with the cross-hatch marked portion 160 to the right (clockwise side) of 330°, as shown in the FIG. 4. When the pilot tunes in to VOR No. 2 with the Course Selector set to 30°, he notes that the CDI needle deflects to the left. He then sets full disc 200 with pointing means pointed at 30°, and with the cross-hatch marked portion 260 to the left (counter-clockwise side) of 30°, as shown in FIG. 4. The resulting clear or transparent quadrant A (the location quadrant), lying between 150° and 210°, is the quadrant in which the aircraft is located, with the pivot shaft 30 representing the destination point. The pilot thus knows the aircraft is located generally south of the destination point. By bisecting the location quadrant A, most easily done by selecting the midpoint of the quadrant B opposite quadrant A using pointing means 130 and 230 to define quadrant B, the pilot selects 0°, or north, as the direction to preceed, flying inbound until one of the legs of quadrant A is intercepted, knowing he would then proceed on that leg to the destination point, in the FROM direction if that leg is the 330° radial of VOR station No. 3, or in the FROM direction if that leg is the 30° radial of VOR station No. 2.

Figure 5:
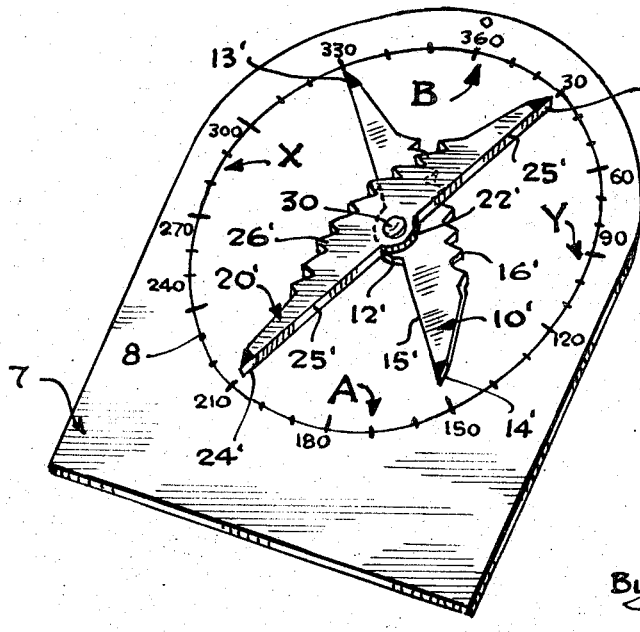
FIG. 5 is a perspective view of a third device illustrating a third embodiment of the invention.

Referring to FIG. 5, there is shown a third embodiment of the invention wherein the device again has an identical base plate 7, but instead of half-disc pointer members, or full-disc pointer members with contrasting half-portions, it has two generally needle-shaped pointer members, each having a curved serrated back edge opposite the straight flat front edge portions. Pointer member 10' has curved serrated back edge 16' opposite its front flat edge 15', and has pointing means 13' and 14'. Pointer member 20' has curved serrated back edge 26' opposite its front flat edge 25', and has pointing means 23' and 24'.

In the device shown in FIG. 5, the located quadrant A is easily recognized as the only quadrant lying between the flat front edges 15', 25' of the two pointers. The other quadrants each are bounded by at least one curved serrated back edge: quadrants X and Y are each bounded by a flat front edge and a serrated back edge; and quadrant B is bounded by two serrated back edges. If desired, the back edges of the pointers, instead of being curved and/or serrated, could be color lined or bulged or otherwise coded or shaped to be distinguished as directionally side-oreinted from center line. The device of FIG. 5 is operated the same as that of FIG. 1-3, using the distinguishing curved, serrated edge as the directional side distinguishing means, comparing with the use of the great mass sides of the half-discs 10 and 20 of FIGS. 1–3, and the use of the portions 160 and 260 of the full discs 100 and 200 of FIG. 4.

To better understand the device shown in FIG. 5, assume that the aircraft's location is unknown and the destination point is a small town airport without VOR broadcast equipment, which airport lies on the 330° radial of a VOR station No. 3 and the 210° radial of a VOR station No. 4. When the pilot tunes in to VOR No. 3 with the Course Selector set to 330°, he notes that the CDI needle deflects to the right. He then sets pointer member 10' at 3 330° with the serrated edge thereof to the right (clockwise side) of 330°, as shown FIG. 5. When the pilot tunes in to VOR No. 4 with the Course Selector set to 210°, he notes that the CDI needle deflects to the right. He then sets pointer member 20' to 210° with the serrated edge thereof to the right (clockwise side) of 210°, as shown in FIG. 5. The resulting straight edge-defined quadrant A, the location quadrant, lies between the straight edges 25' and 15' and pointing means 24' and 14', and is the quadrant in which the aircraft is located, with the pivot shaft 30 representing the destination point. The pilot now bisects the location quadrant A (and quadrant B), most conveniently by noting the midpoint between pointing means 13' and 23', which midpoint is 360°, or north. The pilot accordingly selects north as the direction to proceed until intercepting a leg of quadrant A, whereupon the course will be changed to proceed on that leg to the destination point. The TO or FROM information will be known as explained hereinbefore.

Further uses of the devices shown are as follows:

For long range area navigation, the pilot may set up convenient VOR intersection points as checkpoints along the course to the destination point. He then flies the original course heading until one of the VOR legs of the first checkpoint intersection is intercepted. He then makes a course heading correction, to left if right leg is intercepted first, or to right if left leg is intercepted first. This procedure is repeated with subsequent checkpoints along the course, using the device of this invention to assist him in the necessary determinations, as explained hereinabove.

When the pilot is approaching from a generally known position relative to the destination point, he sets the pointing means of the pointer members to specified radials of two VOR stations so that the quadrant from which he is approaching remains open, clear, or otherwise distinguished from the other quadrants. He then tunes in to the VOR stations and sets the Course Selectors to the radials indicated by the pointing means opposite those defining the open or clear quadrant (the location quadrant) of the device. This, as explained hereinbefore, may be either a TO or FROM course depending on the location of VOR stations. Then the pilot flies a heading parallel to the bisect line of the open quadrant and opposite quadrant until intercepting one leg of the open quadrant, whereupon the course is changed to fly on that leg to the destination point. That bisect line is easily identified by choosing the midpoint between the pointing means opposite those defining the open or clear quadrant (the location quadrant).

Other modifications and variations of the device will be obvious to those skilled in the art without departure from the scope of the invention as defined in the following claims.

I claim:

1. A device comprising a base plate having a circular scale, first and second disc members pivoted at the center of said scale for rotation relative to each other and to said plate about the center of said scale, said first disc disposed between said plate and said second disc, each of said discs having a diameter line extending across the disc, said first disc being dark in color over the one-half thereof on one side of its diameter line and light in color over the other one-half thereof, and said second disc being of a matching dark color over the one-half thereof on one side of its diameter line and transparent over the other half thereof.

* * * * *